United States Patent
Sadoulet et al.

(10) Patent No.: US 7,518,712 B2
(45) Date of Patent: Apr. 14, 2009

(54) TILTED EDGE FOR OPTICAL-TRANSFER-FUNCTION MEASUREMENT

(75) Inventors: Samuel P. Sadoulet, Tucson, AZ (US); Byron Taylor, Tucson, AZ (US)

(73) Assignee: Edmund Optics, Inc., Barrington, NJ (US)

( * ) Notice: Subject to any disclaimer, the term of this patent is extended or adjusted under 35 U.S.C. 154(b) by 328 days.

(21) Appl. No.: 10/967,373

(22) Filed: Oct. 18, 2004

(65) Prior Publication Data

US 2005/0254041 A1   Nov. 17, 2005

Related U.S. Application Data

(60) Provisional application No. 60/570,375, filed on May 12, 2004.

(51) Int. Cl.
*G01B 9/00* (2006.01)

(52) U.S. Cl. ..................... 356/124
(58) Field of Classification Search .......... 356/124–127
See application file for complete search history.

(56) References Cited

U.S. PATENT DOCUMENTS

| 4,241,996 | A | 12/1980 | Weiser |
| 4,972,451 | A | 11/1990 | Brok et al. |
| 5,748,230 | A | 5/1998 | Orlando et al. |
| 2003/0067595 | A1* | 4/2003 | Alderson et al. .......... 356/124.5 |

FOREIGN PATENT DOCUMENTS

WO   WO 03/056392   *   7/2003

OTHER PUBLICATIONS

Haun et al., "Efficient Three-dimensional Imaging From a Small Cylindrical Aperture." IEEE Ultrasonics Symposium, 2000. pp. 1589-1592.*
Bosch et al., "Volume Defined by the Two-Dimensional Modulation Transfer Function Surface: Approximation Obtained from its Sagittal and Tangential Sections. Application to Image Quality Criteria." Journal of Optics, 1985, vol. 16, No. 5, pp. 219-223.*
Staunton, R. C., "CCD Camera Transfer Function Measurement and Its Implication for Sampling and Operator Performance." IEE Conference Publication No. 443, Jul. 1997, pp. 576-580.*
Williams, Don, "Benchmarking of the ISO 12233 Slanted-edge Spatial Frequency Response Plug-in." IS&T's 1998 PICS Conference. pp. 133-136.*

* cited by examiner

*Primary Examiner*—Tarifur Chowdhury
*Assistant Examiner*—Tara S Pajoohi
(74) *Attorney, Agent, or Firm*—Antonio R. Durando

(57) ABSTRACT

The optical transfer function of imaging optics is carried out with a plurality of tilted edges with respect to the edge-response detection line. The effect of the tilt is to stretch out the edge response so that fine details can be detected even operating at a spatial frequency below the Nyquist limit of the detector. The use of multiple targets, each corresponding to a sub-region of the field of view of the optics being tested, enables the simultaneous characterization of the full field of view of the test optics with a single measurement without the use of a magnifying objective. The result is a rapid measurement and a simpler apparatus suitable for high-throughput testing. A pair of tilted edges can be used in a target to also determine the sagittal and tangential OTFs (as well as that of any other arbitrary cross-section). All of these data are acquired with a single measurement.

26 Claims, 12 Drawing Sheets

DIAGRAM                    ACTUAL DATA

TILTED EDGE FOR OPTICAL-TRANSFER-FUNCTION MEASUREMENT

RELATED APPLICATIONS

This application is based on U.S. Provisional Application Ser. No. 60/570,375, filed 12 May 2004.

BACKGROUND OF THE INVENTION

1. Field of the Invention

This invention is related in general to the field of metrology of optical lenses and electro-optic systems. In particular, the invention relates to high-throughput measurements of the optical transfer function of lenses and imaging systems.

2. Description of the Related Art

For the purposes of this disclosure, the term "optics" is used to designate both the field of optics and optical components or systems, as is commonplace in the art. In the field of optics, where objects are imaged by a lens or a system of lenses and the resulting images are used for further processing, it is very important that the images produced by the optics be as true as possible to the objects from which they are formed. The accuracy with which optics produce the image of an object is characterized in the art by the so-called optical transfer function (OTF). The OTF is a combination of the optics' resolution performance, measured by its phase transfer function ($\Phi$TF), and of its ability to transfer contrast, measured by the modulation transfer function (MTF).

Thus, the MTF of an optical system is a measure of its transfer of contrast from the object to the image at a given spatial frequency. As the object details get smaller (i.e., the spatial frequency of the signal increases) the optics' ability to transfer contrast is reduced. In essence, the MTF is a quantitative assessment of how well the optics maintain contrast level as a function of frequency. The MTF of a lens or system is typically represented by a plot of contrast (modulation) as a function of spatial frequency for each field point as measured at the detector plane.

The phase transfer function $\Phi$TF, on the other hand, indicates how much the detail (frequency information) of an object shifts in position at the image plane relative to the object plane at each spatial frequency. Although an ideal $\Phi$TF would be equal to zero at all frequencies, in fact distortion tends to introduce a linear term which may be important in characterizing the performance of an imaging system. Nonetheless, commercial applications often specify image quality only in terms of the system's modulation transfer function. This practice probably stems from the fact that $\Phi$TF's non-linearity has the most influence at high spatial frequencies, where contrast is quite low. Therefore, since low-contrast conditions are typically not of interest, the impact of phase shifts is less significant under practical working conditions, where contrast must be high.

Within the optics industry, it has been normal practice to calculate the OTF of an imaging system using a variety of illumination sources and targets, such as the pinhole, the slit, and the knife edge. The resolution and contrast performance is measured by how well the imaging system reproduces, for example, a sharp edge illuminated by a light source. The approach is simplified by the fact that, as is well understood in the art, the MTF corresponds to the modulus of the one-dimensional Fourier Transform of the line spread function of the imaging system. The line spread function in turn is the derivative of the edge spread function, which describes the image of a line displayed by the detector on the detector entrance face. Therefore, the MTF is readily obtainable from the edge trace formed on the detector by an object with a sharp edge, such as the straight-line edge of a knife.

As illustrated in FIG. 1, the discrete nature of the sensing elements of a pixellated detector necessarily causes the signal to be approximated. The edge trace of the signal received across a sequence of pixels 10 along the edge-response detection line, which in reality decreases progressively with an approximately S-shaped functionality from maximum intensity to zero (shown on the right side of the figure), is reflected at each pixel by intermediate discrete values between a maximum and a minimum (on the left of the figure). Correspondingly, the slope of the edge trace (the line spread function) is characterized by discrete derivative values, rather than by a continuous bell-shaped curve with a single maximum (as shown on the right side of the figure).

One of the problems consistently encountered in this type of measurement is the fact that sampling is often insufficient (that is, the detector is operated below its Nyquist limit of sampling), which produces aliasing in the imaged signal. The traditional method of circumventing this problem has been to use a microscope objective to magnify the region of interest, thereby providing sufficient sampling for operation within the detector's Nyquist limit. FIG. 2 illustrates a typical set up wherein a microscope objective 12 is placed between the test lens 14 and the detector 16 to relay an image of the target 18. A conventional knife edge is positioned on the target 18 normal to the edge-response detection line and a scanning mechanism (illustrated by the bi-directional arrows in the figure) for the objective is used to cover the entire field of view of the optics being tested.

While effective, this solution has the drawback of narrowing the field of view of the detector, which therefore requires that a scanning mechanism be utilized to span the field of the optics being tested. This, in turn, introduces alignment and data-stitching challenges to the process of data acquisition, in addition to the cost of the additional optics and scanning hardware. Most importantly, the use of a microscope objective and the attendant scanning operation greatly affect the speed with which the optical transfer function of an imaging system can be measured.

Current trends in the optics industry require high-precision manufacturing of optical elements and related quality-control processes that are easily adaptable for large-volume production. While production facilities have been able to readily scale up for volume, the quality-control functions have not been able to keep pace with increased manufacturing capabilities. Commercially available instruments for quality control are designed for expensive and relatively slow testing procedures for cost-insensitive low-volume projects. Accordingly, efforts in the art have been directed to improving the quality of the measurements, rather than the speed and suitability of the tests for high-volume quality-control purposes. U.S. Pat. Nos. 4,241,996, 4,972,451 and 5,748,230 describe various techniques based on this general objective of improving accuracy.

Therefore, there is still a strong need for a high-throughput approach for testing optics produced in a high-volume production environment. The ISO international standard for measuring the spatial frequency response (SFR) of electronic still-picture cameras describes a system wherein a slanted edge is used to eliminate the effects of aliasing. The present invention is based on extending this concept to the process of testing imaging optics with multiple, simultaneously imaged optical targets.

BRIEF SUMMARY OF THE INVENTION

The invention lies in carrying out a measurement of the optical transfer function of an optical element in conventional manner using a traditional edge method, but also tilting the edge with respect to the edge-response detection line. The effect of the tilt is to stretch out the edge response so that fine details can be detected even operating at a spatial frequency (measured in the global coordinate system) below the Nyquist limit of the detector. The tilt, in essence, produces a re-sampling of the edge at a spatial frequency higher than the Nyquist limit (measured in the local—with respect to the edge—coordinate system), thereby avoiding aliasing of the signal even while sampling at a below-Nyquist rate.

According to an important aspect of the invention, multiple targets are used, each corresponding to a sub-region (referred to as a "field point" in the art) of the field of view of the optics being tested. Each target includes one or more tilted edges that provide a measurement for the corresponding field point of the optics. This approach enables the simultaneous characterization of the full field of view of the test optics with a single measurement without the use of a magnifying objective. The result is a rapid measurement and a simpler apparatus suitable for high-throughput testing.

According to another aspect of the invention, a pair of tilted edges can be used in a target to also determine the sagittal and tangential OTFs (as well as that of any other arbitrary cross-section). This additional measurement may be carried out locally (i.e., only with respect to one or more particular field points) or globally simply by adding tilted edges to each target and performing the necessary analysis of the contrast data collected simultaneously from each target. Most importantly, all of these data are acquired with a single measurement.

According to still another aspect of the invention, the same concept may be used to characterize the quality of a sub-assembly within an imaging system, such as the lens of a camera. The invention provides a rapid and practical way to calculate the optical transfer function of the system, thereby making it possible to make adjustments in the sub-assembly (such as adjusting the focus of the lens in the camera) to meet predetermined OTF design specifications.

Therefore, the invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENT OF THE INVENTION

Figure 1:
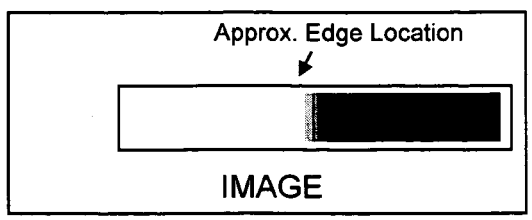
FIG. 1 illustrates the edge traces and the corresponding line spread functions produced along the edge-response detection line by a sharp edge illuminated by a point source, both in terms of actual signals received at the detector face (right side) and output signals produced by the discrete detector pixels (left side).
Figure 1:
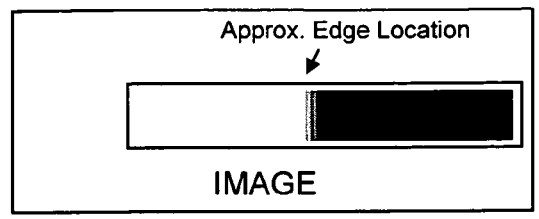
Figure 1:
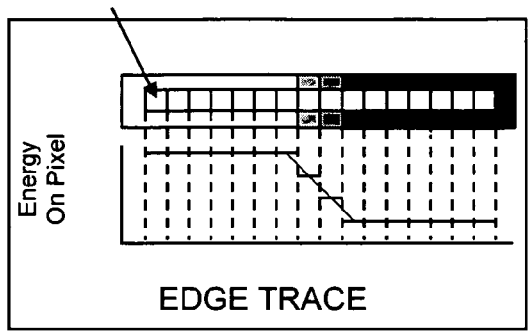
Figure 1:
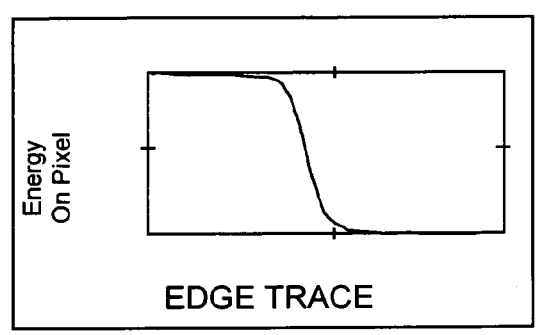
Figure 1:
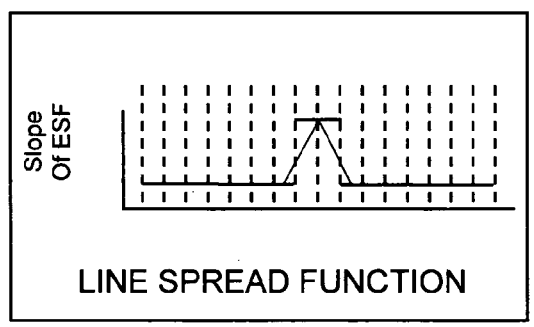
Figure 1:
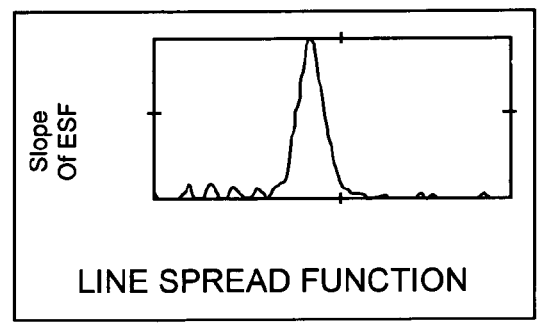
Figure 2:
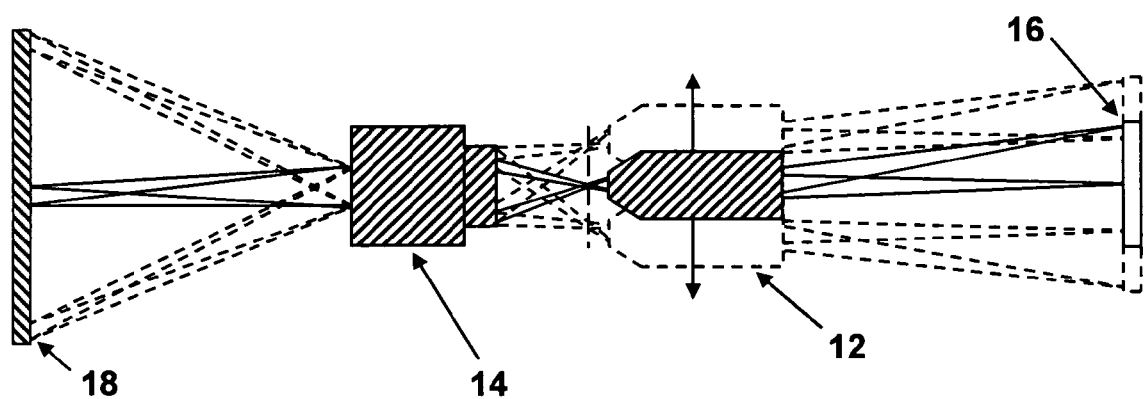
FIG. 2 is a schematic diagram of generic prior-art apparatus used to measure the optical transfer function of optics, wherein a microscope objective is employed to magnify the used to magnify the region of interest.

The inventive aspect of this disclosure lies in the idea of using multiple targets to measure the field of the optics being tested and tilting the edge of conventional edge-scan targets with respect to the edge-response detection line. As defined in the art, this is the line along which the contrast in the image created by the edge in the target is measured across the field of the optics being tested (or across a sub-region of the field, as the case may be). In prior-art apparatus, the edge is kept in perpendicular position with respect to the direction of the detection line. Instead, the present invention introduces an arbitrary tilt which may vary greatly over an optimal angle that depends of the geometry of the system, pixel size and shape, and similar specifications.

The tilt of the invention produces a skewed measurement and a corresponding magnification factor that can be described in terms of two analogous observations. First, the tilt of the edge effectively stretches out the edge response over a larger number of detector pixels, so that finer details may be detected (i.e., the magnification effect). Thus, the tilt may be viewed as shifting and allowing re-sampling of the edge. Second, although the pixel pitch (the inverse of the pixel spacing) remains constant in a global coordinate system (relative to the field of the optics), tilting of the edge changes the pixel pitch in a local coordinate system (relative to the edge). The result is that the tilt allows the detector array to be used at spatial frequencies that meet the Nyquist limit of the detector in the local reference system even though they do not in the global system.

For the purposes of this disclosure, "edge-response detection line" is the line along which the illumination produced by a target containing an edge is being measured by a detector.

Accordingly, edge-response detection line and measurement direction are used interchangeably. The terms "detector" and "sensor" are used with reference to multi-pixel sensors wherein the pixels form a one-dimensional row or a two-dimensional array and each pixel is adapted to receive and measure the intensity of a light beam corresponding to a portion of the field of view of the optical device being tested. The terms are intended to cover also a plurality of individual sensors, of any kind, adjacent to one another and arranged in any arbitrary known geometry that provides the same functionality described with respect to an array detector. Therefore, it is understood that the measurement carried out along an edge-response detection line is obtained by measuring the signal received by each detector pixel substantially along the line.

As mentioned, "global coordinate" system is intended to refer to a conventional three-dimensional system wherein the edge-response detection line is aligned with the X axis; "local coordinate" system is used instead to refer to a system wherein the Y' axis of the system is aligned with the edge of the target. "Imaging optics" refers to mirrors, lenses, and combinations thereof (i.e., reflective, refractive and diffractive elements, alone or in combination), excluding electronic components such as cameras and similar devices. The term "target" is used both with reference to an opaque body of any shape illuminated by a light source to produce a discernible image on an image plane and with reference to the structure that may contain such a body or may itself constitute the body. The term "straight edge" refers to any target edge that contains at least a portion that is sufficiently straight to allow measurements along an edge-response detection line according to conventional OTF techniques. In that case, the angle between such straight edges and the detection line refers to the angle between said portions of the target edges and the detection line.

Figure 3:
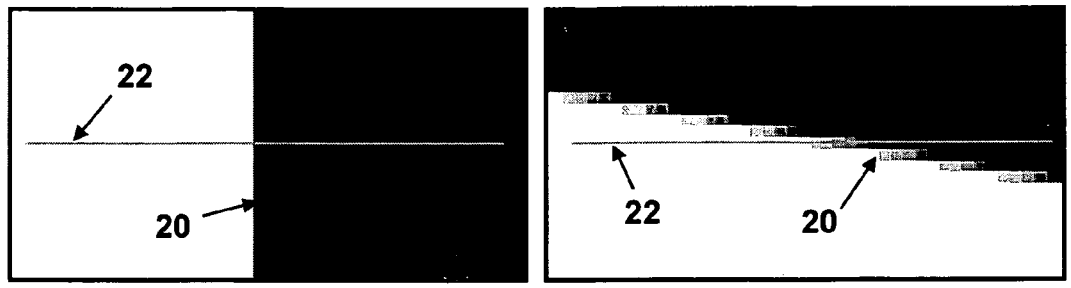
FIG. 3 illustrates, side by side, the images produced by a conventional edge measurement, wherein the edge is perpendicular to the direction of measurement, and by a tilted edge scan according to the invention.
Figure 4:
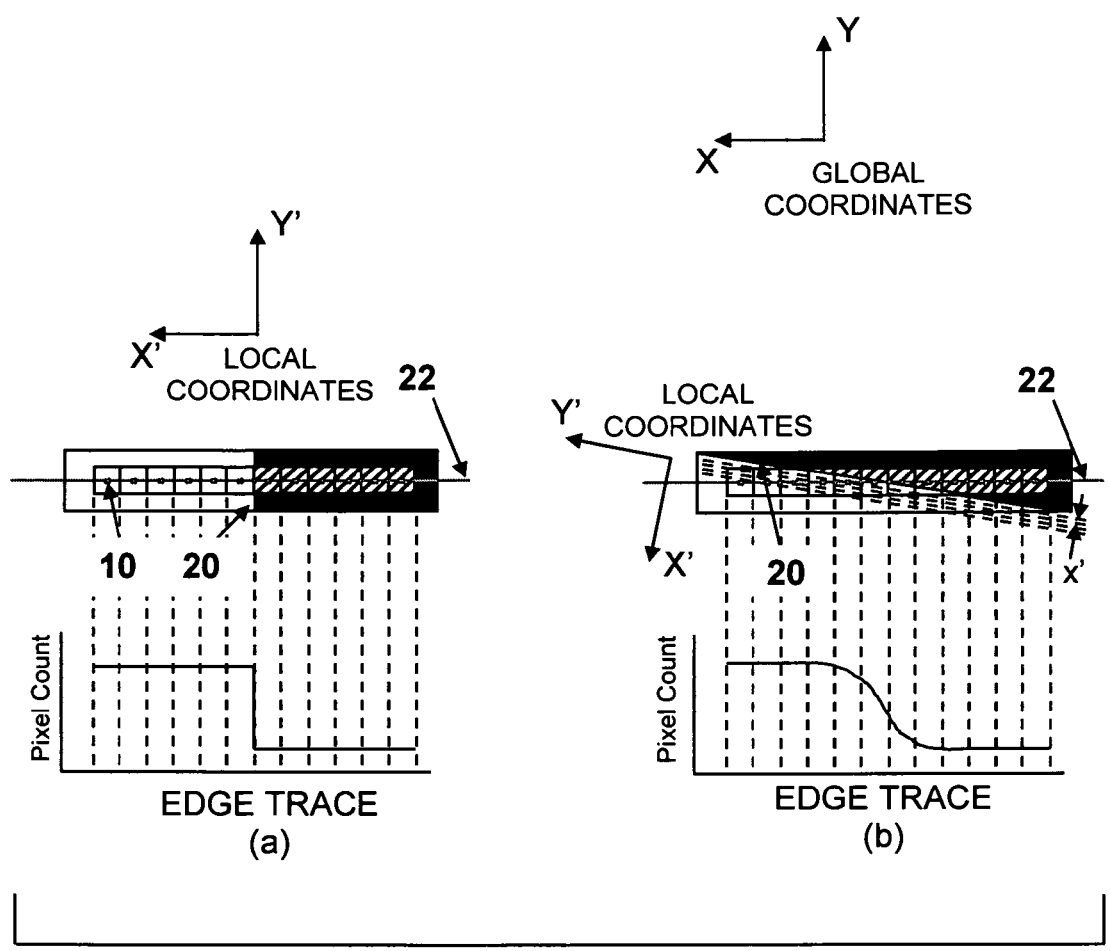
FIG. 4 is a schematic illustration of the effect of introducing a tilt in the edge in relation to the measurement direction, whereby an inter-pixel single-step edge trace is converted to a multi-step edge trace spread over a plurality of detector pixels.

Referring to the drawings, wherein like parts are designated throughout with like numerals and symbols, FIG. 3 illustrates, on the left side, the image detected during a knife-edge measurement in the conventional case where the edge 20 is perpendicular to the edge-response detection line 22. On the right side, the figure illustrates the effect of a tilted edge with respect to the edge-response detection line. As further illustrated by FIG. 4, the edge trace of the conventional scan (Part a) shows a sharp, single-step change from maximum to zero as a function of pixel count (the example corresponds to the case where the edge is located exactly between pixels, but a two-step change would generally arise from an edge falling within a pixel). In this case, the local coordinate system X',Y' is aligned with the global coordinate system X,Y. As shown in Part b of the figure, the process of tilting the edge 20 with respect to the measurement direction (the X coordinate in the global reference system) causes the edge 20 to span over six adjacent pixels along the edge-response detection line, thereby providing six data points instead of one.

Figure 5:
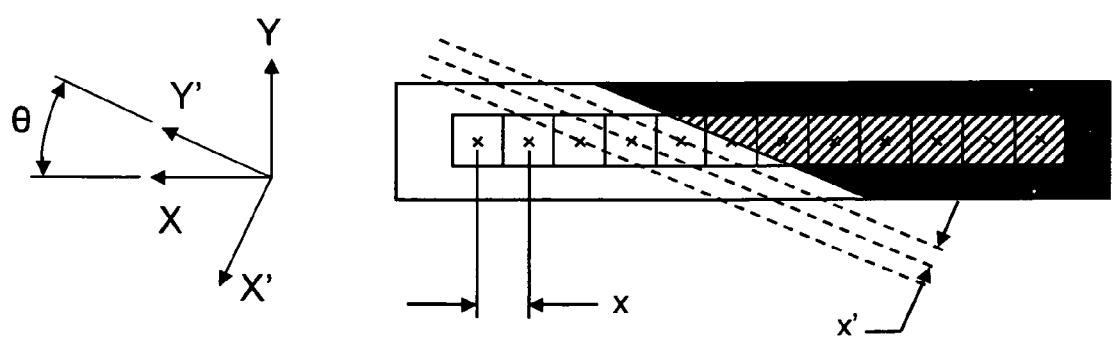
FIG. 5 illustrates the relationship between the local and global coordinates as a function of the angle between the edge and the direction of measurement.

As clearly illustrated in FIG. 5, the distance x between pixel centers (the pixel spacing) in the global coordinate system is reduced to x' in the local coordinate system as a function of the angle $\theta$ between the edge 20 and the edge-response detection line 22 (i.e., $x'=x \sin \theta$). As a result, OTF information about the edge can be obtained well beyond the sampling limit of the detection system. As would be clear to one skilled in the art, the effects of the tilt on the spatial distribution of the signal are taken into account in straightforward manner by including a factor in the calculation of spatial frequency.

Thus, according to the invention, the OTF of a test sample is calculated using an edge that is tilted with respect to the edge-response detection line. Assuming a non-coherent, linear and shift-invariant optical system within each isoplanatic patch (field point), the effects of the tilted edge can be represented mathematically. Considering a back-illuminated knife edge at an angle $\theta=\arctan(b1/a1)$ with respect to the direction of measurement (wherein b1 and a1 are the sine and cosine components, respectively, of a corresponding right-angle triangle—see FIG. 5), its step-function functionality may be represented by $$f(x,y)=\text{step}(a_1 x + b_1 y). \tag{1}$$

Correspondingly, the image is given by the step response or edge response $$\Sigma\{f(x',y')\}=\text{step}(x') \otimes \otimes h(x',y'). \tag{2}$$

As those skilled in the art would readily understand, the OTF can then be calculated from the following equation:

$$OTF = H(\xi) = \mathcal{J}\left\{\frac{d}{dx'}[\Sigma\{\text{step}(x')\}]\right\} \tag{3}$$

The tilt of the edge can be accounted for in straightforward manner by translating the local coordinate axes to the global coordinate axes according to the relation $x'=x \sin \theta$ (see FIG. 5). Thus, the components of the OTF, the modulation transfer function (MTF) and phase transfer function ($\phi$TF) can all be calculated from the relation:

$$OTF=H(\xi)=T(\xi)e^{i\phi(\xi)}=MTF \cdot e^{i(\phi TF)} \tag{4}$$

For instance, the MTF of the system is calculated from the equation $$T(\xi) = \left|\mathcal{J}\left\{\frac{d}{dx'}[\Sigma\{\text{step}(x')\}]\right\}\right| \tag{5}$$

Figure 6:
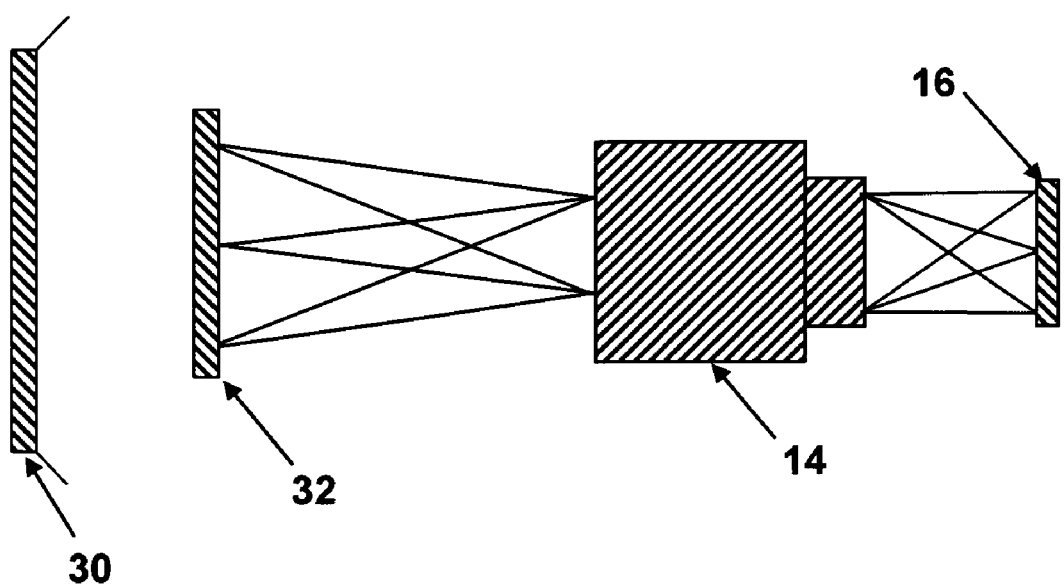
FIG. 6 is a schematic diagram of apparatus for measuring the OTF of optics according to the invention.

FIG. 6 is a schematic representation of a testing device according to the invention. A light source 30 (preferably an extended source, such as a source projected onto a piece of opal flashed window) is preferably used to illuminate the detector 16 through a test lens 14 (or other optics). A target structure 32 containing a plurality of opaque edges (preferably straight edges, such as a knife edge) is adapted for measuring the field of view of the lens 14 at its image plane. The target structure 32 is arranged so that each sub-region of the optics field of view (the so called field points) captures the image of a tilted edge, thereby providing a corresponding measurement.

Figure 7:
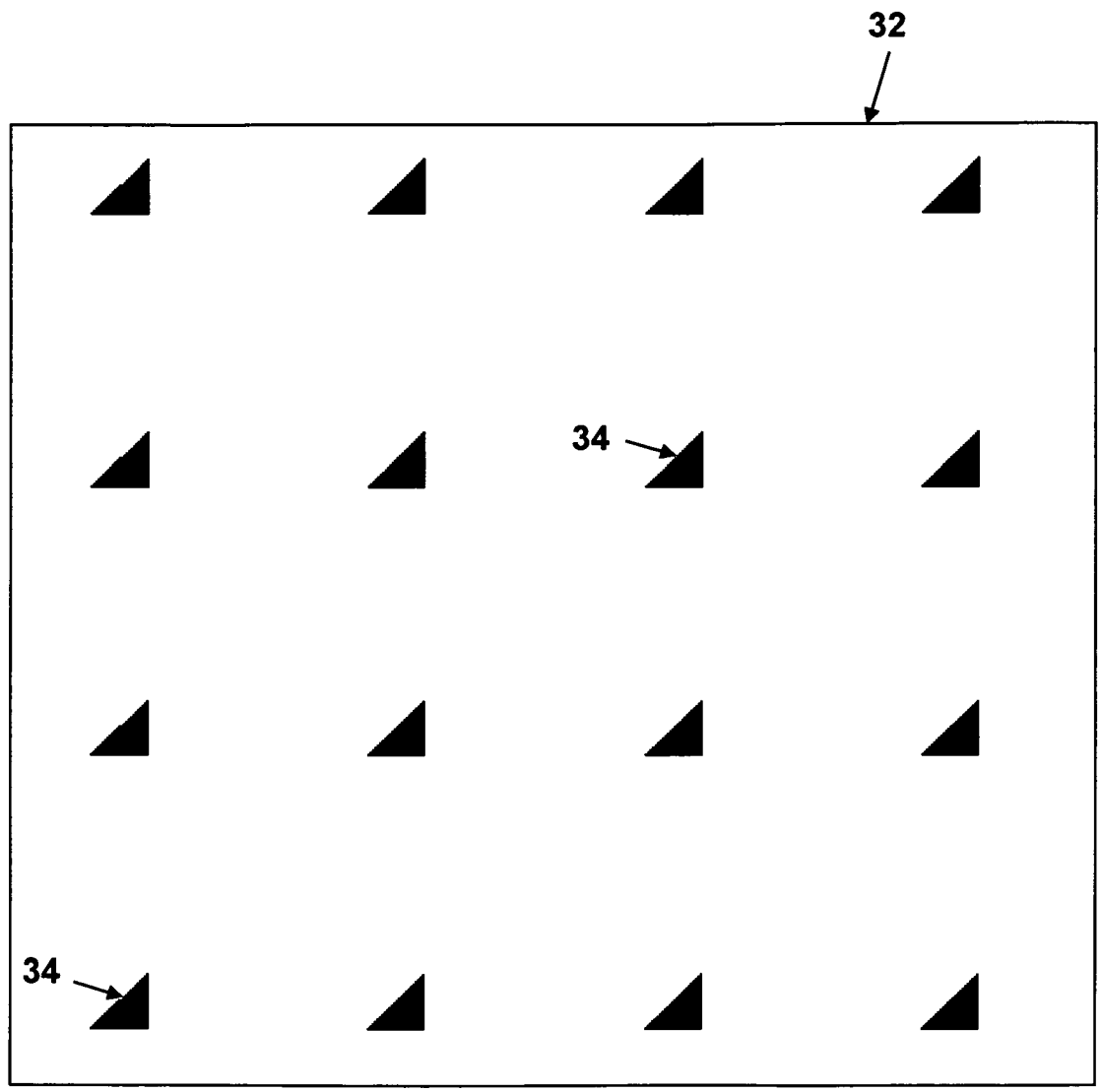
FIG. 7 is a schematic representation of a target structure containing multiple knife-edge targets arranged to substantially cover the entire field of view of imaging optics tested according to the invention.

FIG. 7 illustrates such an arrangement of multiple edges 34 on the target 32. According to the invention, each edge 34 is disposed at a known angle with respect to the edge-response detection line, as illustrated in FIG. 3. Accordingly, the entire field of view of the test lens 14 can be measured simultaneously by acquiring data from all edges 34 during a single measurement. Each detector pixel aligned along a corresponding edge-response detection line registers a transition from maximum to minimum illumination produced by a tilted edge and a corresponding edge trace, which in turn allows the calculation of an OTF, an MTF and a $\Phi$TF for the corresponding sub-region of the field of view of the test lens 14 (assumed isoplanatic), as described above.

The tilt introduced in each edge 34 in relation to the measurement direction produces more data points then would otherwise be available in the spatial-frequency domain, thereby creating a magnification effect that enables sampling at rates below the Nyquist limit of the system. This advantage makes it possible to test an optical system without the aid of a microscope objective, which in turn eliminates the need for scanning to cover the entire field of view. Thus, the lens or optical system 14 may be characterized with a single measurement wherein all edges are measured simultaneously.

Using two edges disposed at different angles in a sub-region of the field of view, the sagittal and tangential cross-sections of the OTF can also be measured by picking appropriate edge orientations relative to the optical axis of the system. In fact, any arbitrary cross-section orientation can be measured in the same manner.

It is understood that the measurement of a single edge yields the cross section of the OTF normal to the edge. Therefore, the simplest method for obtaining any cross-section of the OTF is to setup the edge normal to it. The edge-response detection line can then be appropriately oriented with respect to the edge, according to the invention, in order to produce adequate sampling.

Figure 8A:
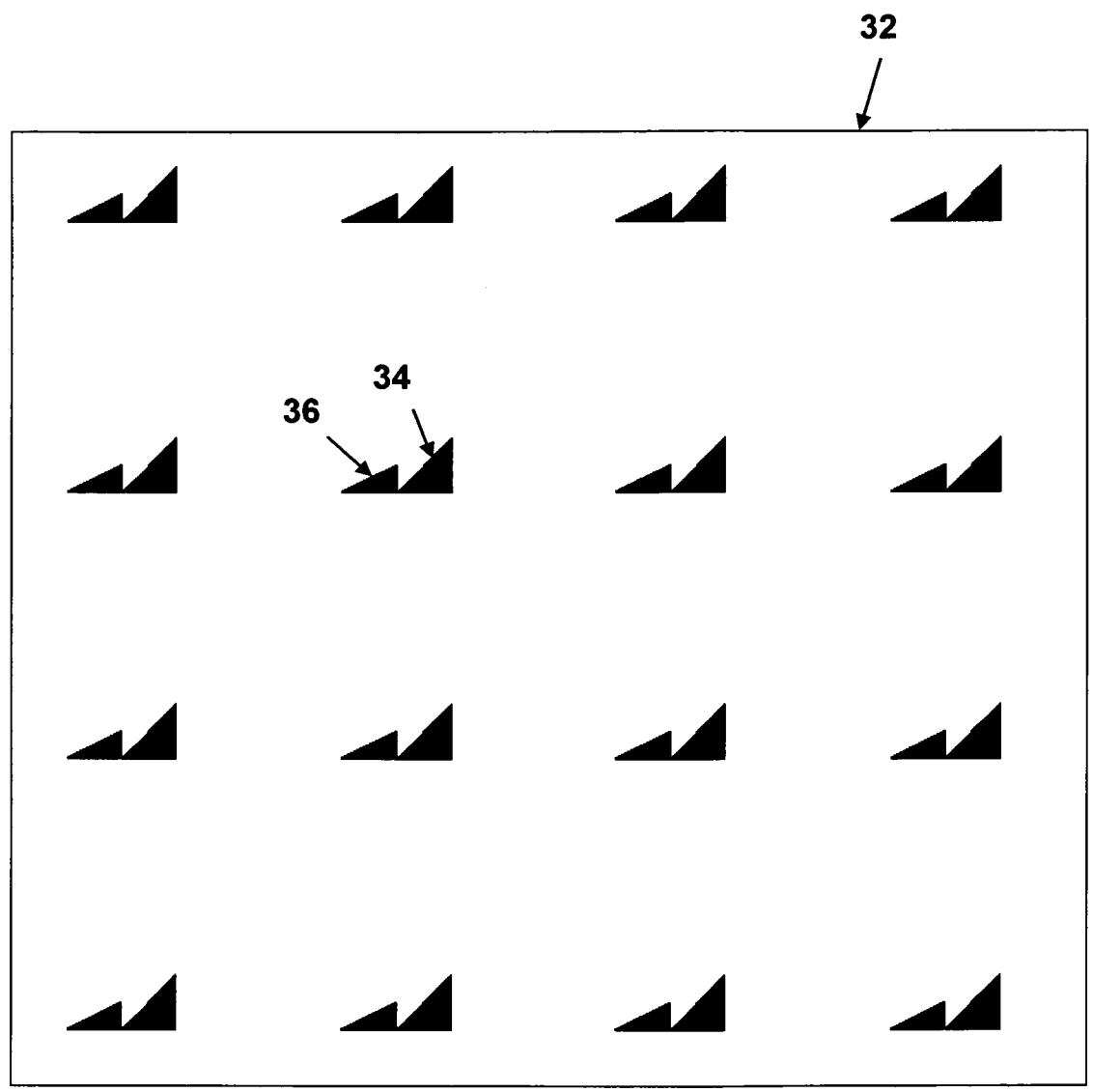
FIGS. 8A, 8B and 8C illustrate targets containing multiple knife edges to enable the calculation of sagittal and tangential OTFs of corresponding field points.
Figure 8B:
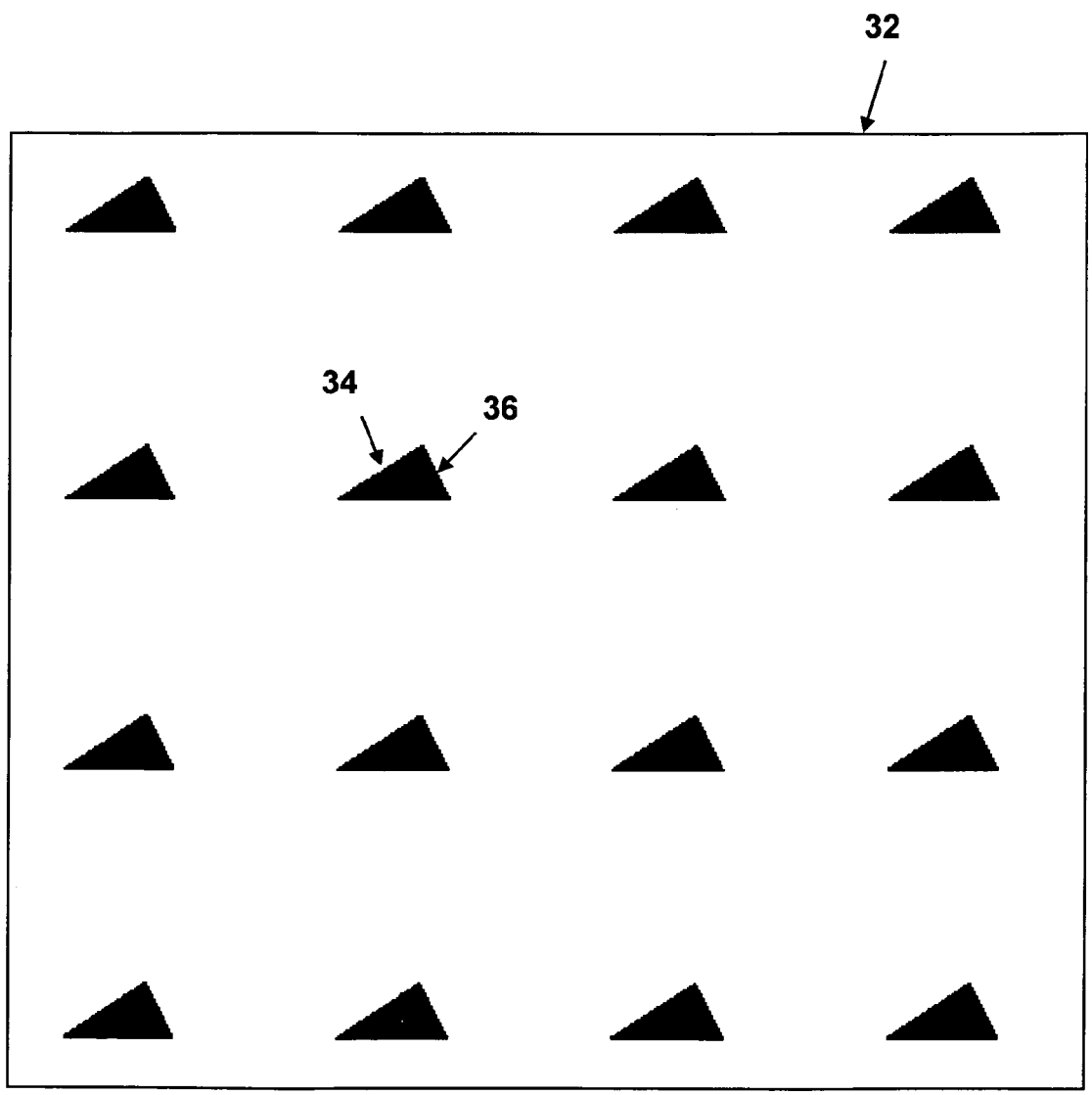
Figure 8C:
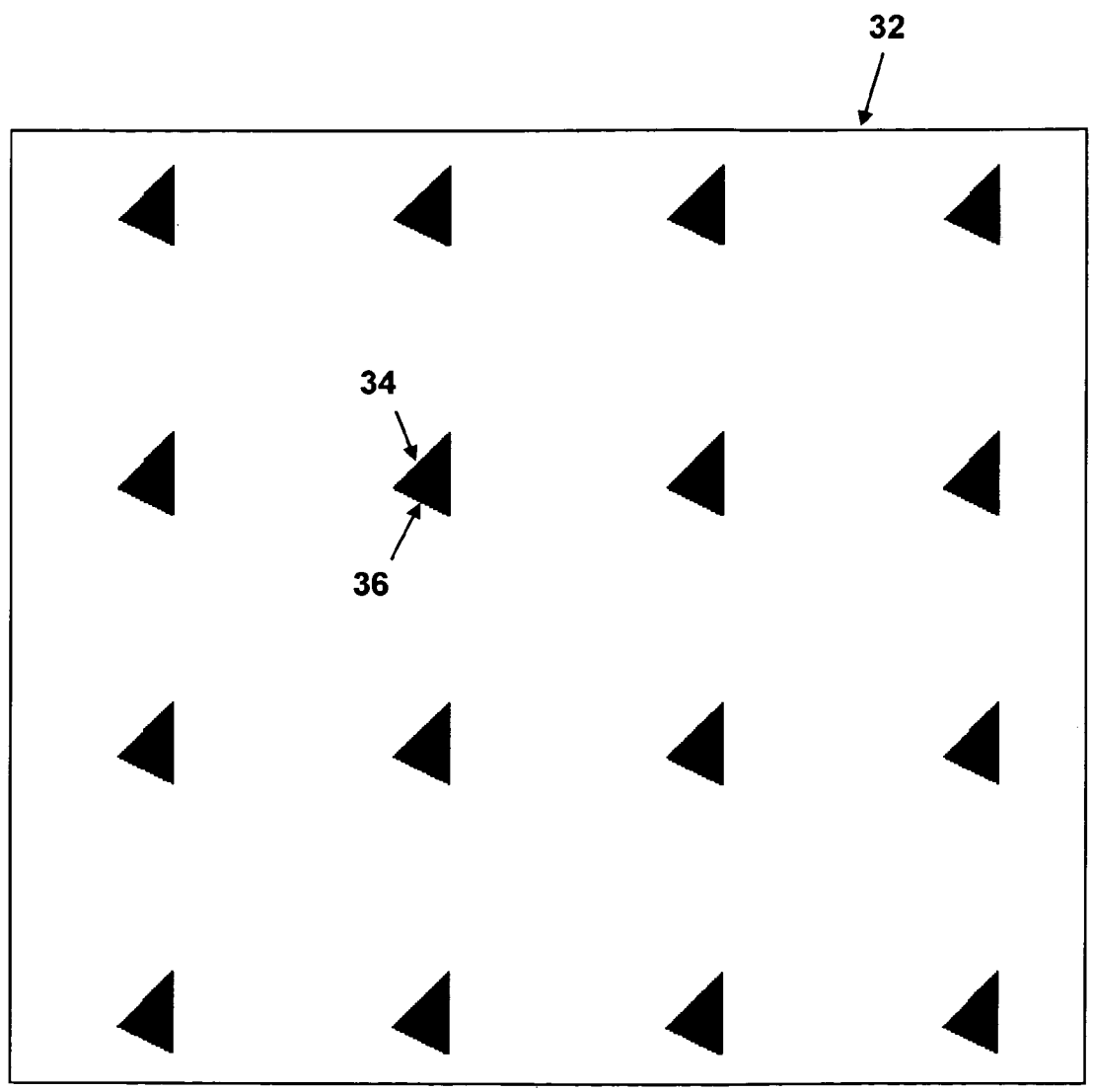

If the measurement of a cross section that is not normal to the edge is desired, two or more edges 34,36, as shown in FIGS. 8A-8C, can be measured to produce two edge response functions for a single sub-region of the field of view. As long as the two edges are close to one another, the impulse response of the system can be assumed to be constant. The two measurements can therefore be mathematically decomposed into the two cross-sections of interest.

Figure 9:
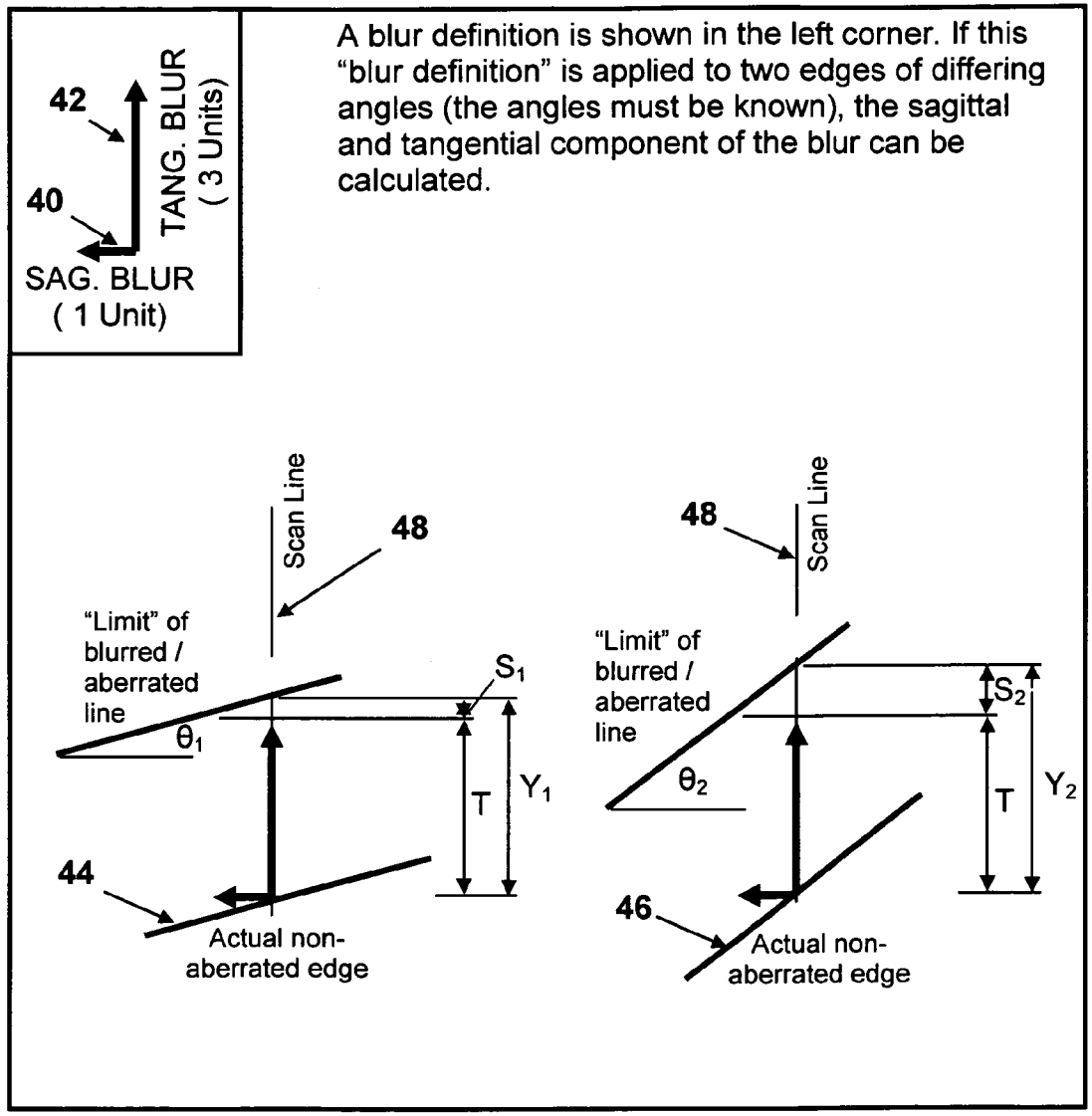
FIG. 9 illustrates the use of two edges of known differing angles within a target sub-region to calculate the sagittal and tangential components of the blur introduces by imaging optics.

FIG. 9 illustrates this fundamental principle with a simplistic model wherein a general blur (resulting from lens aberration) is represented by 1 unit in the sagittal axis 40 and 3 units in the tangential axis 42. If the tilt angles $\theta_1$, $\theta_2$ of the edges 44,46 with respect to the measurement line 48 are accurately known, two sets of equations may be derived which can be solved for two unknowns, the sagittal and tangential components of the blur, $B_{SAG}$ and $B_{TAN}$, respectively, as follows:

$$B_{SAG} = \frac{\tan(\theta_1) - \tan(\theta_2)}{\Delta Y}, \quad (6)$$

$$B_{TAN} = Y_1 - B_{SAG}\tan(\theta_1) \quad (7)$$
$$B_{TAN} = Y_2 - B_{SAG}\tan(\theta_2),$$

where $\Delta Y$ is the total blur ($S_1$+T and $S_2$+T for edges 44 and 46, respectively) measured along the measurement direction 48.

It is noted that this approach is equally applicable to other orientations (that is, not necessarily saggital and tangential). Although several edges are used in the example, it is also clear that the method could be implemented with a single edge and multiple measurements by rotating either the edge or the measurement line with respect to the other.

Figure 10A:
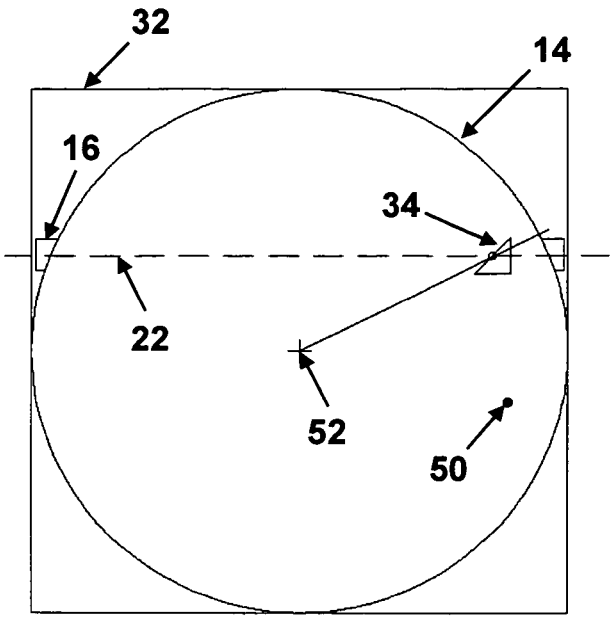
FIGS. 10A and 10B are a schematic illustration of a line sensor rotated to align the detection line with a particular tangential direction of interest and a target rotated with the sensor and shifted to overlap a point of interest in the field of view of a lens, so that a tangential measurement could be performed at that point.
Figure 10B:
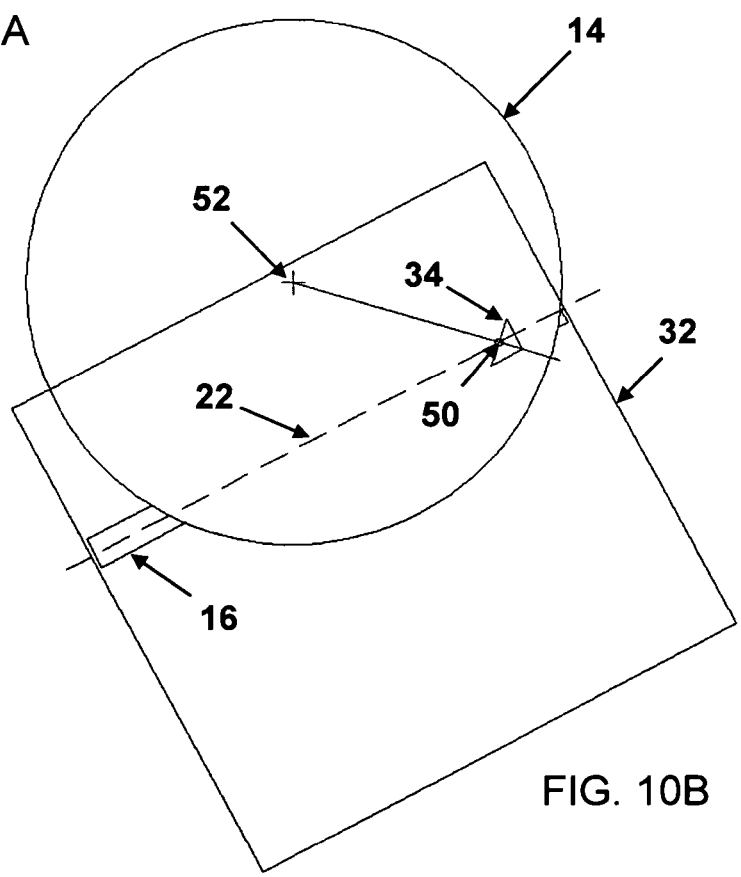

In another approach, which is preferred for the purpose of calculating tangential and sagittal OTFs, the sensor and the target are rotated together and offset, if necessary, to cause the detection line of the sensor to overlap any point of interest in the test optics and to acquire OTF information in any desired direction. This form of alignment simplifies the process of carrying out tangential and sagittal measurements anywhere in the field of the test lens. Assuming, for example, that the detection line 22 of a line detector 16 in a system and the target structure 32 were aligned with a test lens 14 as illustrated in FIG. 10A, it would be possible to make a tangential measurement at a generic point 50 in the field of the lens simply by rotating and shifting the target and the sensor together. As shown in FIG. 10B, the target structure 32 (only one is shown for simplicity of illustration) and the sensor 16 are rotated by an amount sufficient to align the edge 34 perpendicular to the tangential direction of the lens 14 and then they are shifted together as necessary to cause the detection line 22 to pass through the intersection of the edge and the point 50. As a result of this operation, the angular relationship between the target edge and the detection line is retained and the resulting measurement provides the desired tangential OTF information.

Figure 11:
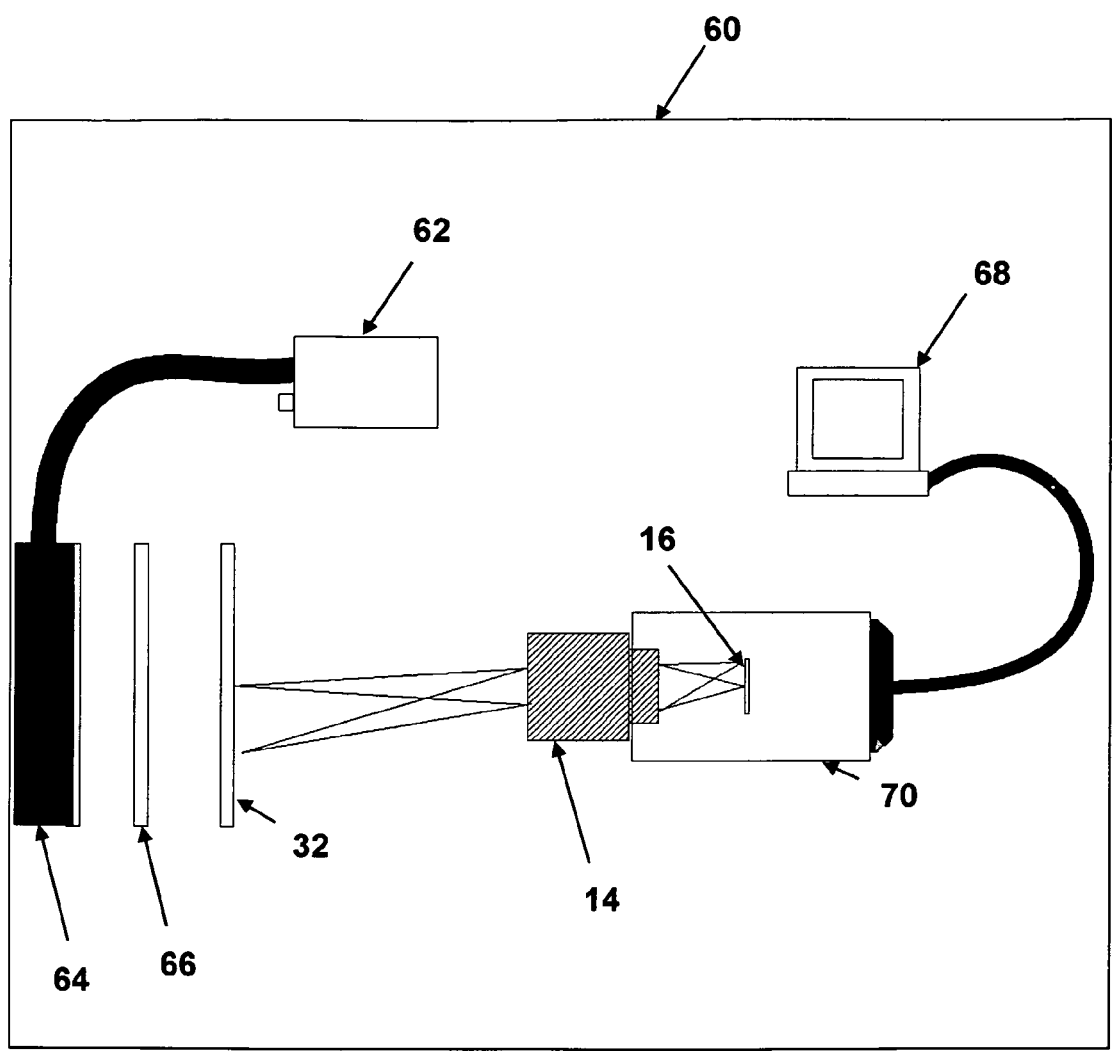
FIG. 11 is a schematic representation of a system modified according to the invention to measure the optical transfer function of generic optics.

FIG. 11 illustrates a practical implementation of a system 60 for measuring the OTFs of optics according to the invention. As mentioned above, the light source consists preferably of an extended source provided by a fiber-optic illuminater 62 coupled to a fiber-optic backlight 64 and an opal-flashed glass 66 illuminating the target 32 of the invention. A computer 68 coupled to the camera 70 is included in the system in conventional manner to carry out any automated functions and to calculate OTFs, MTFs and ΦTFs, as described.

It is understood that the concept of the invention could be implemented in similar fashion to measure the optical characteristics of imaging optics or to calibrate imaging optics to a predetermined desired transfer function. For example, a lens mounted on a camera is designed to produce a certain optical transfer function for the system that depends on the exact position of the lens within the system. The method of the invention can be advantageously used to calibrate the system simply by adjusting the lens' position until the desired performance is produced. As well understood in the art, appropriate adjustments would have to be made to account for the individual optical transfer functions of the various components in the optical system.

The targets of the invention have been described in terms of knife edges, but it is understood that slits, squares, or any similar structure with a straight edge (or combinations thereof) could be used in equivalent manner. Similarly, in practice a straight edge is preferred, but any other edge of known geometry could be used as well with appropriate geometric factors applied to the calculations. The angle θ should be selected so as to provide the desired number of pixel overlap at any given time. For example, an angle θ of about 10 degrees (with respect to the line of detection) produces an overlap of 40 pixels in a conventional 1024×1024 pixel, 9.2-mm² detector (wherein each pixel is 0.009×0.009 mm².

The tilted-edge idea of the invention has been illustrated for simplicity in terms of a detector array wherein each row of pixels is aligned with the measurement direction and the edge is tilted with respect to the detector rows as well as the detection line. It is anticipated that the concept of the invention could be implemented also in other configurations, with various degrees of rotation of the detector varying the effect of the edge tilt. Therefore, a detector with any pixel configuration could be used, but with different degrees of efficiency and requiring more complex geometrical adjustments to the calculations of the OTF.

Therefore, while the invention has been shown and described in what is believed to be the most practical and preferred embodiments, it is recognized that departures can be made therefrom within the scope of the invention, which is not to be limited to the details disclosed but is to be accorded the full scope of the claims so as to embrace any and all equivalent apparatus and methods.

We claim:

1. An apparatus for testing imaging optics, comprising:
   a light source;

a plurality of targets for creating a plurality of simultaneous images thereof through said imaging optics upon exposure to said light source;

a light detector adapted to acquire intensity signals associated with said plurality of simultaneous images; and means for computing spread functions corresponding to said plurality of simultaneous images from said intensity signals acquired by the light detector;

wherein said targets are positioned at non-orthogonal angles with respect to corresponding edge-response detection lines of the detector; and wherein some of said targets comprise two straight edges disposed at different angles selected for computing spread functions for sagittal and tangential cross-sections of the imaging optics.

2. The apparatus of claim 1, further comprising means for computing optical transfer functions corresponding to said spread functions.

3. The apparatus of claim 1, further comprising means for computing modulation transfer functions corresponding to said spread functions.

4. The apparatus of claim 1, further comprising means for computing phase transfer functions corresponding to said spread functions.

5. The apparatus of claim 1, wherein said targets are contained within a single structure.

6. The apparatus of claim 1, wherein said light source is an extended source.

7. The apparatus of claim 1, further comprising means for computing optical transfer functions, modulation transfer functions, and phase transfer functions corresponding to said spread functions; wherein said targets are contained within a single structure; and wherein said light source is an extended source.

8. In an apparatus for testing imaging optics comprising a light source, a plurality of targets for creating a plurality of simultaneous images thereof through said imaging optics upon exposure to said light source, a light detector adapted to acquire intensity signals associated with said plurality of simultaneous images, and means for computing spread functions corresponding to said plurality of simultaneous images from said intensity signals acquired by the light detector, the improvement comprising:

a plurality of straight edges in said targets, said edges being positioned at non-orthogonal angles with respect to corresponding edge-response detection lines of the detector;

wherein some of said targets comprise two straight edges disposed at different angles selected for computing spread functions for sagittal and tangential cross-sections of the imaging optics.

9. The apparatus of claim 8, further comprising means for computing optical transfer functions corresponding to said spread functions.

10. The apparatus of claim 8, further comprising means for computing modulation transfer functions corresponding to said spread functions.

11. The apparatus of claim 8, further comprising means for computing phase transfer functions corresponding to said spread functions.

12. The apparatus of claim 8, wherein said targets are contained in a single structure.

13. The apparatus of claim 8, wherein said light source is an extended source.

14. The apparatus of claim 8, further comprising means for computing optical transfer functions, modulation transfer functions, and phase transfer functions corresponding to said spread functions; and wherein said light source is an extended source.

15. A method for testing imaging optics, comprising the following steps:

providing a plurality of targets positioned at non-orthogonal angles with respect to corresponding edge-response detection lines of a detector;

illuminating said plurality of targets to produce a corresponding plurality of simultaneous images thereof on the detector through a field of view of said imaging optics:

acquiring intensity signals associated with said plurality of simultaneous images; and computing spread functions corresponding to said plurality of simultaneous images from said intensity signals;

wherein some of said targets comprise two straight edges disposed at different angles and said computing step includes computing spread functions for sagittal and tangential cross-sections of said field of view of the imaging optics.

16. The method of claim 15, further comprising the step of computing optical transfer functions corresponding to said spread functions.

17. The method of claim 15, further comprising the step of computing modulation transfer functions corresponding to said spread functions.

18. The method of claim 15, further comprising the step of computing phase transfer functions corresponding to said spread functions.

19. The method of claim 15, further comprising the step of rotating said targets and said detector so as to align said detection lines with a particular direction and said targets with a particular point of said field of view of the imaging optics.

20. In a process for testing imaging optics, wherein a detector is used to acquire intensity signals associated with an image produced by illuminating an object through a field of view of the imaging optics, the improvement comprising the steps of:

providing an object that includes a plurality of targets positioned at non-orthogonal angles with respect to corresponding edge-response detection lines of the detector; and providing means for computing spread functions corresponding to a plurality of simultaneous images produced by said plurality of targets;

wherein some of said targets comprise two straight edges disposed at different angles, and further comprising the step of providing means for computing spread functions for sagittal and tangential cross-sections of said field of view of the imaging optics.

21. The process of claim 20, further comprising the step of providing means for computing optical transfer functions corresponding to said spread functions.

22. The process of claim 20, further comprising the step of providing means for computing modulation transfer functions corresponding to said spread functions.

23. The process of claim 20, further comprising the step of providing means for computing phase transfer functions corresponding to said spread functions.

24. A method for calibrating imaging optics in an imaging system, comprising the following steps:

providing a plurality of targets positioned at non-orthogonal angles with respect to corresponding edge-response detection lines of a detector;

illuminating said plurality of targets to produce a corresponding plurality of simultaneous images thereof on the detector through a field of view of said imaging system;

acquiring intensity signals associated with said plurality of simultaneous images;

computing spread functions corresponding to said plurality of simultaneous images from said intensity signals; and adjusting an optical parameter of said imaging optics of the imaging system until said spread functions meet predetermined specifications;

wherein some of said targets comprise two straight edges disposed at different angles and said computing step includes computing spread functions for sagittal and tangential cross-sections of said field of view of the imaging system.

25. The method of claim 24, wherein said imaging system is an objective of a camera, said detector is a sensor of the camera, and said optical parameter is a position of the objective with respect to said sensor.

26. In a system for testing imaging optics comprising a light source, a straight-edge target for creating an image thereof through said imaging optics upon exposure to said light source, a light detector adapted to acquire intensity signals associated with said image, means for computing a spread function corresponding to said image from said intensity signals acquired by the light detector, wherein said straight-edge target is positioned at a non-orthogonal angle with respect to an edge-response detection line of the detector, a method for acquiring said intensity signals in a particular direction of data acquisition through a particular point of interest in a field of view of said imaging optics, said method comprising the following steps:

rotating the detector and the target by an equal amount as necessary to align the edge-response detection line with said particular direction of data acquisition;

shifting the target, if necessary, so as to overlap said particular point of interest in the field of view of the imaging optics; and operating the system to acquire said intensity signals and compute said spread function.

* * * * *